Nov. 23, 1965    M. L. GERBER    3,219,392
BLOWER APPARATUS
Filed June 19, 1961    4 Sheets-Sheet 1
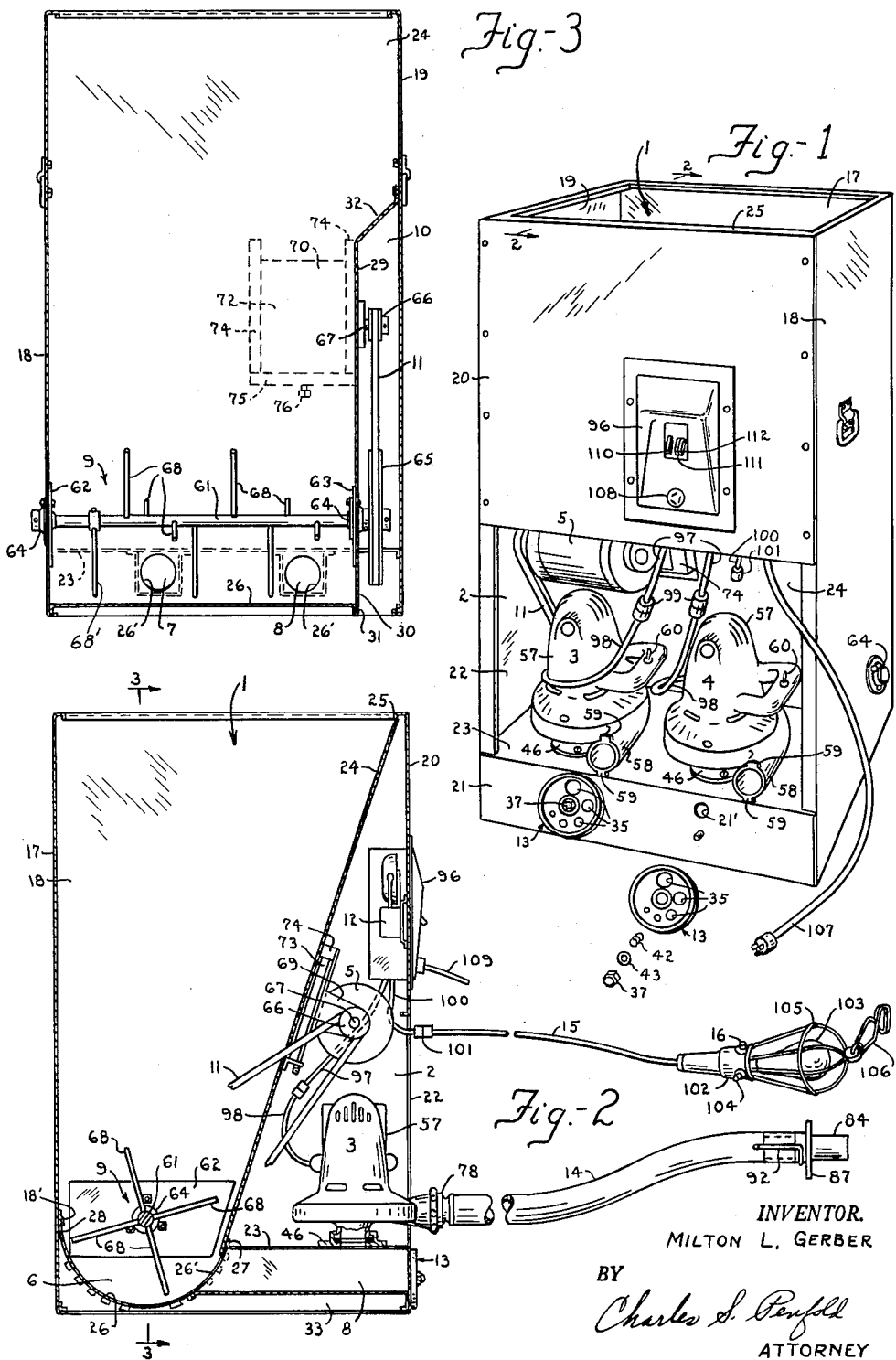
INVENTOR.
MILTON L. GERBER
BY
Charles S. Penfold
ATTORNEY Nov. 23, 1965  M. L. GERBER  3,219,392
BLOWER APPARATUS
Filed June 19, 1961  4 Sheets-Sheet 2

INVENTOR.
MILTON L. GERBER
BY
Charles S. Penfold
ATTORNEY

Nov. 23, 1965    M. L. GERBER    3,219,392
BLOWER APPARATUS
Filed June 19, 1961    4 Sheets-Sheet 3
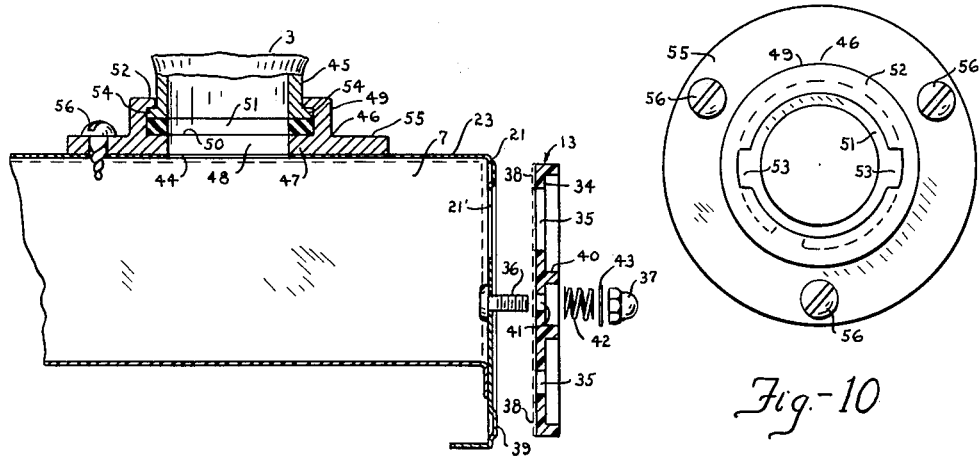
Fig.-9
Fig.-10
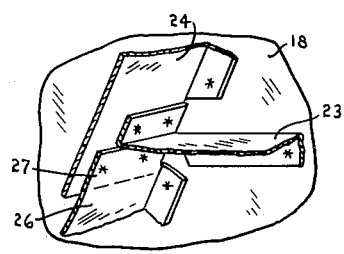
Fig.-11
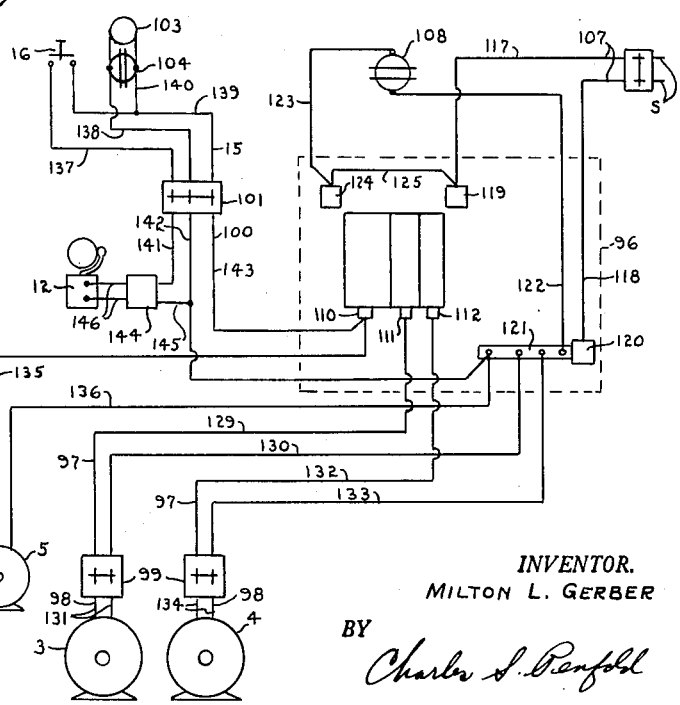
Fig.-12
INVENTOR.
MILTON L. GERBER
BY
Charles S. Penfold
ATTORNEY Nov. 23, 1965 M. L. GERBER 3,219,392
BLOWER APPARATUS
Filed June 19, 1961 4 Sheets-Sheet 4

INVENTOR.
MILTON L. GERBER
BY
Charles S. Penfold
ATTORNEY

United States Patent Office 3,219,392
Patented Nov. 23, 1965

3,219,392
BLOWER APPARATUS
Milton L. Gerber, R.R. 1, Craigville, Ind.
Filed June 19, 1961, Ser. No. 118,044
9 Claims. (Cl. 302—36)

The subject invention relates generally to blowers and more particularly is directed to a machine or apparatus for conducting or dispensing a lightweight comminuted material or product from the machine through a conduit or pipe.

The invention may be utilized for any purpose desired but is preferably designed and constructed for blowing or conducting granulated insulation into voids, such as between studding or ceiling joists of buildings.

The machine embodying the subject invention comprises, among other things, a receptacle for the product, a conduit extending from the machine, and a blower unit or means associated with the receptacle and conduit for conducting the product from the receptacle and out through the conduit.

One of the significant objectives of the invention is to provide a machine of the above character, including the provision of a signal on the machine, and a control whereby an individual dispensing the product at a remote location may operate the signal so that an operator stationed at the machine can regulate or control the flow of the product in response to instructions received from such individual.

A particular object of the invention is to provide an improved electrical system of signalling.

An important object of the invention is to provide a machine having a pair of blower units which can be selectively or jointly operated to increase or decrease the capacity of the flow or output of the product from the machine. More particularly, provision is made whereby two conduits may be attached to the machine for use by two individuals in conducting the product to substantially the same or different locations.

A specific but important object of the invention is to provide a machine in which each of the blower units preferably comprises a housing having an inlet communicatively connected to the receptacle by an elongate passage or duct, an outlet for connection with the conduit, a fan, and an electric motor for driving the fan to draw the product into said inlet from the receptacle via said passage.

A particular object is to provide a pair of valve means which are selectively adjustable to vent the passages to assist in controlling the density flow of the product through the passages and conduits.

Another object of the invention is to provide improved means for agitating the product in the receptacle to facilitate its flow into the passages above referred to.

Also, a specific object of the invention is to provide a machine in which provision is made therein for housing or storing one or more conduits, various nozzles and fittings, and one or more electrical extension cords constituting components or accessories of the machine.

Another object of the invention is to provide a machine in which the blower units or power operated means and means for operating the agitating means are located in compartments therefor for protection against the product.

An additional object of the invention is to provide a novel valved nozzle assembly and fittings embodying improved principles of design and construction for controlling and/or directing the flow of the product to the location desired.

An important object of the invention is to provide a machine which is compact, relatively portable, stable, durable and efficient and offers advantages with respect to safety, manufacture and assembly, unitized construction, and low cost of operation and maintenance.

A further objective of the invention is to provide a novel method of assembling the components of a nozzle assembly.

Also, an object is to provide an improved electrical system.

Additional objects and advantages of the invention will become apparent after the description hereinafter set forth is considered in conjunction with the drawing annexed hereto in which a preferred embodiment of the machine is exemplified.

In the drawing:

FIGURE 1 is a front perspective view of the machine;

FIGURE 2 is a vertical section taken substantially on line 2—2 of FIGURE 1, showing particularly the structure of the agitating means and passages or ducts which communicatively connect the receptacle with the blower units;

FIGURE 3 is a vertical section taken substantially on line 3—3 of FIGURE 2, showing other details of the agitating means, the blower units and one of the passages or ducts and the signal;

FIGURE 9 is a partial section showing the mode of mounting or supporting the blower units and a motor for the agitating means, including details of the valve means;

FIGURE 10 is a top view of one of a pair of mountings on the machine which serve to detachably connect the blower units thereto;

FIGURE 11 is an enlarged partial interior view of the cabinet illustrating the mode of attaching components thereof together;

FIGURE 12 is a view of the circuitry employed for operatively connecting the electrical components of the machine;

Figure 4:
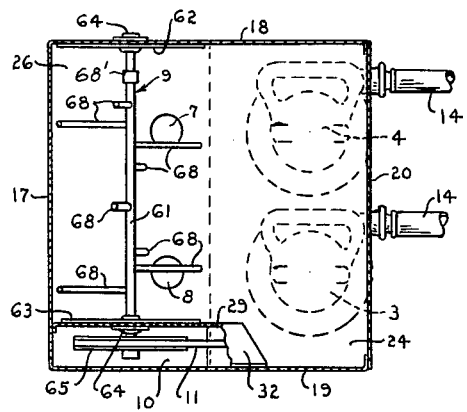
FIGURE 4 is a horizontal section taken through the machine to illustrate details of certain wall structures thereof.

The machine or apparatus embodying the invention or inventions comprises a cabinet which is preferably constructed to include a receptacle or hopper generally designated 1 for the product, a front compartment or recess 2 within which a pair of motor powered blower units 3 and 4 and a motor 5 are disposed, a chamber 6 at the bottom of the receptacle, a pair of passages 7 and 8 respectively communicatively connecting the chamber 6 and blower units, agitating means generally designated 9 disposed in the chamber assisting to direct the product therefrom to said passages, a compartment 10 with belt means 11 substantially therein operatively connecting the motor 5 with the agitating means, a signal 12 in the compartment, a pair of valve means generally designated 13 for controlling the flow of the product to the blower units, a pair of conduit means 14 detachably connectible with the units, and electrical extension cord means 15 provided with a lamp socket having a switch 16 associated therewith which can be actuated by an individual manipulating the conduit means at a remote location to operate the signal in a manner whereby to advise another individual or operator stationed at the machine to stop or start either or both motors. The cabinet is preferably provided with handles, as shown, for convenience in shifting or carrying the machine.

Figure 7:
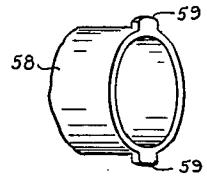
FIGURE 7 is a partial pictorial view of a fitting constituting the outlet of each of the blower units.

The cabinet may be designed and constructed as desired and as clearly shown in FIGURES 1, 2, 3 and 4, it is preferably generally box-like in shape and includes a rear vertical panel or wall 17, a pair of vertical parallel side walls 18 and 19, an upper detachably vertical front panel or wall 20, a lower vertical front wall 21 spaced from the upper front panel to provide an opening 22 affording access to the blower units 3 and 4 and the motor 5 mounted on a horizontal platform or wall 23. The cabinet also includes an inclined partition or wall 24 having a lower edge joined to a rear edge portion of the platform 23, an upper edge disposed under a horizontal inturned flange 25 on the upper panel 20 and side edge portions joined to the side walls 18 and 19 as evidenced in FIGURE 11. As shown in FIGURE 1, the rear panel 17 and side walls 18 and 19 may also be provided with inturned flanges similar to the flange 25 and the side walls with inturned vertical flanges to which the upper front panel 20 and lower front wall 21 are attached. The cabinet is also provided with a semi-cylindrical channel or wall 26 having a front edge portion 27 joined to the lower edge of the inclined partition 24 as shown in FIGURES 2 and 11, a rear edge 28 joined to the rear panel 17 or caught under a flange 18' on the panel and end edge portions which are respectively joined to the side wall 18 and a partition or wall 29 as shown in FIGURE 3. The channel 26 forms the chamber 6, above referred to, and constitutes a lower continuation of the receptacle 1 and receives the product. The inclined partition 24, in combination with the rear panel 17 and side walls 18 and 19, defines the receptacle or container 1 for the product and in combination with the side walls and platform 23 defines the front compartment 2 within the blower units and electric motor are arranged. The partition 29, as shown in FIGURES 3 and 4, is spaced from the side wall 19 to form the compartment 10 for substantially receiving the belt means 11 operatively connecting the motor 5 and agitating means 9. The partition 29 has a rear edge joined to the partition 24, a lower portion 30 having an arcuate edge portion 31 joined to the channel 26, and an upper sloping wall 32 joined to the side wall 19. It should be noted that the lower portion 30 of the partition 29 serves as an end wall of the channel 26. The edges of the platform 23, partitions 24 and 29 and channel 26, and other walls of the cabinet may be joined or connected in various ways but as depicted in FIGURES 2 and 7, they are preferably provided with the flanges, above referred to, which are spot-welded in place to promote stability.

The platform 23 is located at a level above the lower edges of the cabinet and in combination with the channel 26, side walls 18 and 19 and lower front wall 21 defines a bottom chamber 33 within which the pair of passages or ducts 7 and 8 are arranged or constructed to communicatively connect the chamber 6 with the blower units. The pair of valve means 13 are respectively associated with the passages for regulating or controlling the density flow of the product from the receptacle and chamber, the latter of which, in effect, constitutes a single bin or container for the product.

The passages or ducts 7 and 8, above referred to, may be designed and constructed as desired but as illustrated in FIGURES 2, 3 and 9, each preferably includes a channel member having a horizontal bottom wall and a pair of vertical side walls having outturned flanges which are secured to the underside of the platform 23 to form in combination therewith such passages. The inner ends of the channel members are shaped to merge with the exterior curved surface of the channel 26 and communicatively connect with openings 26' provided therefor in the channel 26. The outer ends of the channel members are secured to the lower front wall 21 of the cabinet and communicatively connect with openings 21' provided therefor in this wall, the latter constituting a depending continuation of the platform 23 as shown in FIGURES 9.

Each of the valve means 13, which is clearly exemplified in FIGURES 1 and 9, serves to control admission of air into a passage via the opening 21', preferably comprises an annular cuplike plate 34 provided with a plurality of circumferentially spaced ports 35 or apertures of various or graduated sizes. Each plate is preferably pivotally mounted on a threaded bolt 36 carried by the lower front wall 21 and a cap nut 37 may be used to detachably secure the plates to such bolts. The rear side of each plate is preferably provided with an annular formation comprised of a plurality of radially extending serrations 38 which are adapted to register with an annular boss 39 provided on the front wall 21 in order to assist in firmly securing the plate in place after adjustment. The front side of each plate is preferably provided with a socket 40 having a hole 41 therein through which the bolt extends. A helical spring 42 and a washer 43 are preferably attached to each bolt for disposition in the socket, with the nut extended for convenient manipulation. The springs serve to maintain the plates in pressure bearing relationship against the wall 21. With this unique setup either plate can be pivotally adjusted to place any one of its ports in registery with an adjacent opening 21' in the wall 21 to vary the volume of air admitted, which controls the density flow of the product. Otherwise expressed, the valve means may be utilized to control or vary the density of the material and its rate of flow as well as control or vary the volume and rate of the flow of the air admitted.

Figure 5:
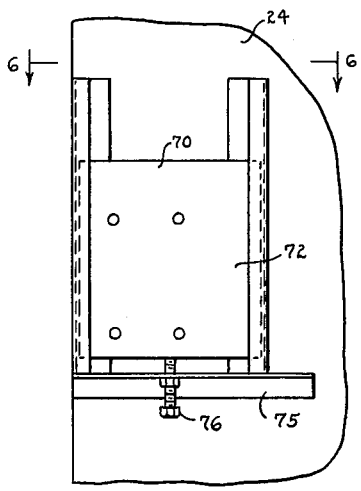
FIGURE 5 is an elevational view depicting means for mounting a motor for driving the agitating means.

The platform 23 is provided with a pair of corresponding openings 44, which are shown in FIGURE 5. As illustrated in FIGURE 9, each of the blower units is provided with a tubular inlet 45 which is detachably connected to a tubular mounting 46, which in turn is detachably connected to the platform in axial relation to an opening. More specifically in this regard, each of the mountings include a bottom wall 47 provided with an aperture 48 which registers with an opening 44, a socket 49 having a seat 50 with a gasket 51 thereon, a top wall 52 having diametrically disposed entrance openings 53 therein for receiving a pair of lugs 54 on the tubular inlet 45 for movement in the socket under the top wall in a manner whereby each blower unit can be readily adjustably secured in any desired sealed rotative position against the gasket. The gaskets serve as seals as well as means to respectively resiliently support the blower units to reduce noise and vibration when they are in operation. Each of the mountings also preferably include an outwardly extending circumferential flange 55 having holes therein through which screws 56 or equivalent means may be extended into tapped holes in the platform for attaching the mountings thereto.

Each of the blower units includes a housing 57 which is provided with the tubular inlet 45 just described, a tubular outlet 58 provided with lugs 59, a motor operated fan for drawing air from a passage through the tubular inlet and out through the tubular outlet into a conduit means 14 when attached thereto, and a switch 60 on each motor housing for controlling the motor.

The agitating means generally designated 9, belt means 11 and means for mounting the motor 5 will now be described. The agitating means may be designed and constructed in various ways but as exemplified, particularly in FIGURES 2, 3 and 4, preferably comprises an elongate shaft 61 having its ends respectively extending through the side wall 18 and partition 29 of the cabinet and a pair of plates 62 and 63 which are respectively secured to the inner sides of the wall and partition to reenforce same and support bearings 64 of the sealed in type for rotatably supporting the shaft in a horizontal postiion in the bottom of the receptacle and preferably slightly above the chamber 6. A relatively large pulley 65 is keyed to the shaft and located in the compartment 10 for connection with a smaller pulley 66 keyed to a shaft 67 of the motor 5. The shaft of the agitating means is preferably provided with a plurality of radially extending elements or fingers 68 and a finger 68' which are so circumferentially spaced about and axially along the axis of the shaft to efficiently agitate or loosen the product and assist in directing it into the passages 7 and 8. The finger 68' is provided with a collar having a set screw so that the finger can be readily adjusted about and along the axis of the shaft 61 to locate the finger in a desirable position at one end of the chamber 6 to efficiently loosen the product. Attention is directed to the fact that certain of the fingers are axially spaced apart shorter distances in the vicinity of the passages in order to insure a positive agitation at the inner ends of the passages to promote the flow of the product into the passages. More specifically, the fingers or members 68 are so located that as they revolve, pairs of fingers pass alternately at the sides of each of the openings 26' leading to the passages 7 and 8. Attention is directed to the fact that various components are preferably sealed with respect to one another in order to confine and efficiently control the flow of the product while preventing its escape into the compartments 2, 10 and 33.

Figure 6:
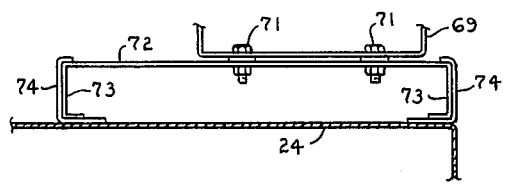
FIGURE 6 is a transverse section taken substantially on line 6—6 of FIGURE 5 illustrating certain details of the motor mounting means.

The motor 5 for driving the shaft of the agitating means may be mounted as desired but as depicted in FIGURES 2, 5 and 6, for example, it is preferably mounted on the inclined wall 24 for disposition in the compartment or recess 2 at the front side of the cabinet. More specifically in this regard, the motor is adapted for detachable connection with a mounting 69 which in turn is detachably connected to a slide 70 by bolts 71. This slide includes a base wall 72 to which the mounting is attached and side walls 73 which slide in parallel channel guides 74 anchored to the wall 24. A member 75, preferably of angle iron, is also anchored to the wall against the lower ends of the guides and may serve as an abutment for the slide depending on whether an adjusting screw 76 carried by the member is fully retracted or extended for engaging the lower end of the slide to adjustably position the slide to vary the tension of the belt 11. Due to the inclination of the guides and slide and the weight of the motor the latter normally tends to move downwardly but it can be readily moved upwardly by manipulating the screw to tighten the belt on the pulleys.

Figure 8:
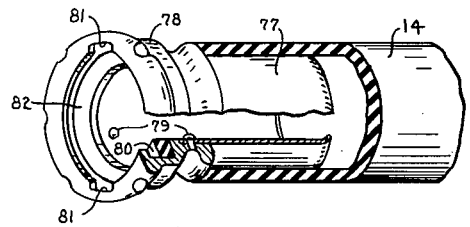
FIGURE 8 is a pictorial view, with portions in section, of one of the pair of conduit means adapted for connection with either of the outlets of the blower units.

The conduits 14 adapted for selective connection with the tubular outlets 58 of the blower units will now be described. Each of the conduits, as exemplified in FIGURES 3 and 4, is provided with a coupling or fitting for connection with either of the aforesaid outlets. The couplings may be designed and constructed as desired, but each preferably includes a tubular member 77 having an inner extremity which is cemented or otherwise secured in an inner end of the conduit as shown in FIGURE 8. A sleeve or female fitting 78, preferably of moulded plastic, is secured to an exposed extremity of the tubular member and against the conduit by rivets 79 or equivalent means. This sleeve has a head having a socket 80 provided with diametrically spaced entrance openings 81 for receiving the lugs 59 on either of the tubular outlets in a manner whereby rotation of the sleeve, member and conduit as a unit will cause the lugs to be received in the socket and bear against a gasket 82 for sealing and releasably maintaining the connection. The head of the sleeve may be provided with interruptions, as shown, to facilitate gripping and turning of the unit in detachably connecting the fitting 78 to either of the tubular outlets 58.

The outer end of each conduit is preferably provided with a novel valved nozzle assembly of the character illustrated in FIGURES 13, 14, 15 and 16. Each of these assemblies preferably includes an inner tubular fitting 83 and a similar outer tubular fitting 84 joined to the fitting 83 by a transparent tubular sleeve or window 85, preferably constructed of Lucite. The inner ends of the fittings are preferably cemented or otherwise sealed or secured in the open ends of the sleeve to promote a continuous passage through the assembly. It will be noted that the ends of the sleeve are preferably recessed at 86 to receive the inner ends of the fittings. The fittings may be of equal or different lengths. The fitting 83 is cemented or otherwise secured in the open end of a conduit with the end of the conduit preferably abutting one end of the sleeve and the fitting 84 is preferably provided with a readily detachable annular shield or guard 87, preferably constructed from some desirable material, as rubber, which can be slidably adjusted to any desired position on the sleeve, such as against the sleeve, as shown. This shield serves to protect the hand or hands of the individual manipulating the assembly. The outer fitting 84 may constitute a nozzle or, if desired, an additional nozzle 88 such as the one depicted in FIGURE 17 may be slidably mounted on the fitting 84. The nozzle 88 is preferably provided with an outlet opening 89 which intersects the lower portion of its barrel and an end wall of the fitting for directing the product downwardly and forwardly.

Figure 16:
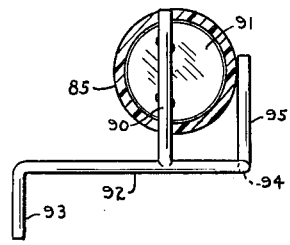
FIGURE 16 is a vertical section taken substantially on line 16—16 of FIGURE 14.
Figure 15:
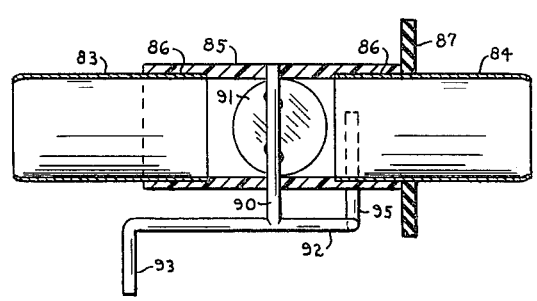
FIGURE 15 is a horizontal sectional view of the structure depicted in FIGURE 14, with the valve in an open position.
Figure 14:
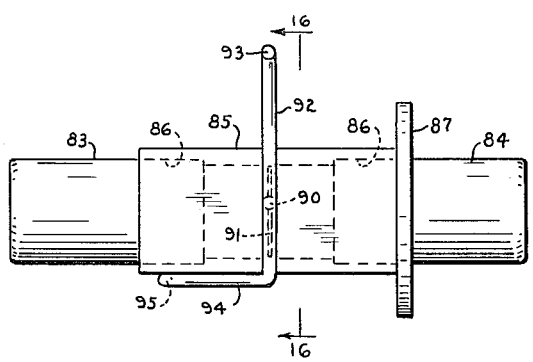
FIGURE 14 is a side elevational view of a coupling adapted for attachment to each of the conduit means, with a valve operatively associated therewith for controlling the flow of the product through the conduit means and coupling.
Figure 17:
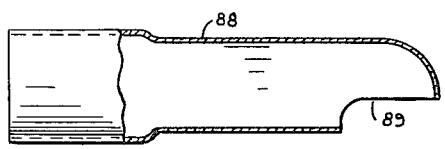
FIGURE 17 is one of various kinds of nozzles which may be fitted on the coupling.

A shaft 90 for a disc-like valve 91 of the butterfly type extends through aligned holes provided therefor in the transparent sleeve 85 in an off-center position for rotation as shown in FIGURE 16. The valve is preferably permanently secured by spot-welding to the shaft in an off-center position before the fittings are secured to the sleeve. The valve provides a positive and immediate shut-off of the flow of the product at the location where the product is being dispensed and also prevents spillage from the conduits when the machine is moved from one location to another. The valve structures further prevent plugging of the conduits because the valve is mounted off-center, thereby affording a greater free area for the product to begin flowing when the valve is opened. In other words, the sleeve is of a length to afford sufficient space for entry of the welding apparatus before the sleeve is secured to the fittings. The valve serves to lock the shaft is place for rotation. An end of the shaft is preferably provided with a straight portion 92 joined intermediate its ends to the shaft in a perpendicular position with respect thereto. This straight portion is disposed in spaced relation to the sleeve and one end is provided with a handle 93. The straight portion and handle may be considered as a crank for manipulating the shaft and valve. The opposite end of the straight portion is preferably provided with a bent portion 94 disposed at right angles to the straight portion and shaft and the bent portion is provided with an offset 95 arranged at right angles to the bent portion and parallel to the shaft for engaging the sleeve at a location forwardly of the valve as depicted in FIGURE 15 to indicate that the valve is completely open or at a location rearwardly of the valve as shown in FIGURES 14 and 16 to indicate that the valve is completely closed to prevent the flow of the product from the assembly. It should be noted that the straight portion of the crank is generally parallel to the longitudinal axes of the fittings and sleeve when the valve is open and generally perpendicular to such axes when the valve is closed.

Thus, the straight portion, in effect, may serve as an indicator to determine when the valve is open or closed, notwithstanding the fact that the valve is clearly visible through the sleeve to determine its condition.

As will be described more in detail subsequently with respect to the circuitry exemplified in FIGURE 12 a junction box 96 is preferably detachably mounted in an opening provided therefor in the front panel 20 of the cabinet. This box, as depicted in FIGURE 1, has a pair of electrical conduits 97 extending therefrom into the front compartment or recess 2 of the cabinet and a pair of electrical conduits 98 extending from the blower units are detachably connectible with the conduits 97 by a pair of plug and socket connectors 99. A conduit 100 also extends from the box 96 and plug and socket connectors 101 serve to detachably connect this conduit to the extension cord 15. As stated above, this cord is provided with a socket and a lamp which may be respectively identified by numerals 102 and 103. The socket is provided with the switch 16, above referred to, for operating the signal 12 to advise an operator stationed at the machine to stop or start either or both of the blower units. The socket may also be provided with a second switch 104 to turn the lamp "on" or "off" and a guard 105 may be fastened to the socket to protect the lamp. The guard may be provided with a special spring fingered clamp 106 which is preferably pivotally connected to a fitting at the free enlarged end of the guard. A conduit 107 is also connected to the box for connection with an electrical source.

The junction box 96 is also provided with a socket 108 to which another extension cord, such as 109, corresponding to the cord 15, can be connected for use with the other of the pair of conduits 14 or it may be utilized for any purpose desired. The box is further provided with switches 110, 111 and 112 which will be referred to subsequently.

Figure 13:
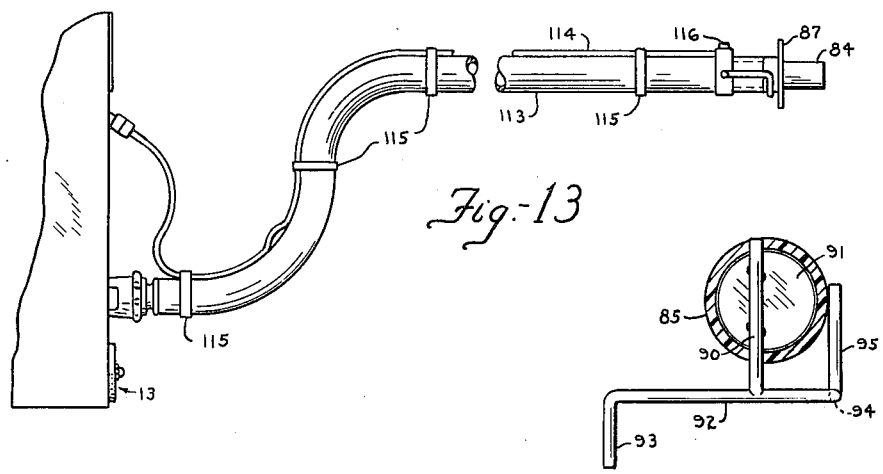
FIGURE 13 is a modified subassembly disclosing wherein a conduit means may be provided with a switch for operating a signal to an operator stationed at the machine.

If found desirable, a conduit structure of the character exemplified in FIGURE 13 may be employed in lieu of either of the conduits 14. The structure includes a conduit 113 and an electrical cord 114 which are operatively associated by means of bands 115 securing the cord to the conduit. The inner end of the cord is connectible, for example, with the conduit 100 and its outer end is provided with a switch 116 for operating the signal 12. If found desirable, the cord or conductor wires therein can be embedded or disposed within the wall or confines of the conduit and a lamp could be operatively connected with the conduit so that the lamp and switches are operable from the conduit.

Referring to the circuitry depicted in FIGURE 12 of the drawing in conjunction with FIGURES 1 and 2, the conduit 107 is adapted for detachable connection with a source S of electricity and contains a pair of conductors 117 and 118 which are respectively connected to a bus bar 119 and a ground or neutral bar 120, the latter of which is associated with a buss bar 121 housed in the box 96. A pair of conductors 122 and 123 are respectively connected to the socket 108 and buss bar 121 and a bus bar 124, the latter of which is connected to the bar 119 by a conductor 125. The three switches 110, 111 and 112 are operatively associated with the bars 119 and 124.

One of the pair of conduits 97 contains a pair of conductors 129 and 130 which respectively connect with one of the plug and socket connectors 99 and the switch 111 and buss bar 121, and one of the conduits 98 contains a pair of conductors 131 connected with the blower unit 3. This switch serves to start or stop the motor of the blower unit 3. The other of the pair of conduits 97 contains conductors 132 and 133 which are respectively connected to the other of the plug and socket connectors 99 and the switch 112 and the bar 121, and the connector 99 is connected to the other blower unit 4 by conductors 134 in the other of the conduits 98. This switch serves to stop or start the motor of the blower unit 4.

A conduit (not shown) in FIGURES 1 and 2 contains a pair of conductors 135 and 136 which respectively connect the motor 5 and the switch 110 and bar 121. This switch serves to stop or start the motor to control the operation of the agitating means 9.

The extension cord 15 contains three conductors 137, 138 and 139. The conductors 137 and 139 respectively connect the switch 16 and the plug and socket connectors 101. A conductor 140 connects the switch 104 on the cord with the conductor 139 and the conductor 138 is connected to the switch and connectors 101. The conduit 100 contains conductors 141, 142 and 143 which are connected to the connectors 101. The conductor 141 is also connected to a transformer 144 for the signal, the conductor 142 to the bar 121 and the conductor 143 to the switch 110. A conductor 145 connects with the conductor 142 and a pair of conductors 146 connect the transformer 144 with the signal 12, which is preferably in the form of a bell. The switch 110 also serves to render the signal devices operative or inoperative. The switch 16 on the extension cord 15 when operated serves to energize the signal 12 to inform the operator or individual at the machine to control the operation thereof in accord with any previously established signal or code between such individual and the individual or operator that is installing the product at a remote location.

Having thus described my invention, it is obvious that various modifications may be made in the same without departing from the spirit of the invention, and, therefore, I do not wish to be understood as limiting myself to the exact forms, constructions, arrangements, and combinations of parts herein shown and described.

I claim:

1. Structure of the kind described comprising an upper front vertical wall and a lower vertical front wall disposed in spaced relation to said upper front wall; a rear vertical wall disposed in spaced parallel relation to said front walls; a pair of opposed parallel vertical side walls; said front, side and rear walls defining a cabinet; a horizontal wall extending inwardly from an upper edge of said lower front wall; an upstanding inclined wall having an upper edge disposed adjacent an upper edge of said upper front wall, side edges connected to said side walls and a lower portion disposed adjacent an inner edge of said horizontal wall whereby said front walls, said side walls, said horizontal wall and said inclined wall define a compartment which is accessible via the space between said front walls; trough structure and said side walls, said rear wall and said inclined wall defining in combination with said trough structure a receptacle for a product; an elongate horizontal duct having an inner end communicating with the interior of said trough structure and disposed below an upper surface of said horizontal wall and transversely to said lower front wall and said trough structure; said lower front wall constituting an end of said duct, an opening provided in said end; valve means for controlling the admission of air into said duct through said opening; means for agitating the product in said trough structure; power means disposed substantially within the confines of said cabinet for operating said agitating means; a blower unit mounted substantially within the confines of said compartment and having an inlet connected with an upper portion of said duct at a location intermediate its length and having an outlet through which the product can be discharged; and means for controlling operating said blower unit.

2. The structure defined in claim 1, including an additional substantially corresponding elongate duct and in which both ducts have inner ends communicating with the trough structure and outer ends terminating at said lower front wall, said lower front wall is provided with a pair of openings respectively communicating with said ducts, a pair of valve means are respectively operatively associated with said opening for selectively controlling the admission of air to said ducts, and an additional corresponding blower unit is similarly mounted on said horizontal wall in said compartment and connected to said additional duct, and means are provided for controlling the operation of said additional blower unit independently of said first-mentioned blower unit.

3. A machine of the kind described comprising a cabinet provided with a receptacle for a product to be conveyed and an unrestricted elongate duct disposed within the confines of said cabinet and having an inner end communicatively connected to the interior of said receptacle adjacent its bottom and extending therefrom, a motorized blower unit disposed substantially within the confines of said cabinet and having a chamber provided with a bottom inlet communicating with the top of said duct at a location intermediate its length and an outlet whereby the product may be withdrawn from the receptacle into the duct and into the chamber for blowing through said outlet, said duct also having an outer end, and valve means operatively associated with said outer end for controlling the admission of air into said duct.

4. The machine defined in claim 3, in which said cabinet is provided with a compartment adjacent said receptacle and includes a horizontal wall, said duct is defined by said horizontal wall and a channel secured thereto, and said blower unit is supported from said horizontal wall.

5. The machine defined in claim 3, in which said cabinet is provided with a compartment adjacent said receptacle, an agitator is disposed in said receptacle, and means for operating said blower unit and said agitator are both disposed in said compartment.

6. The machine defined in claim 3, including a conduit of appreciable length having one end connected to the outlet of said blower unit and a free end provided with a valve and a window for visibly ascertaining the conditions of the product and the position of the valve whereby the relative positions of this valve and said valve means may be correlated to control the density flow of the product through said conduit.

7. The machine defined in claim 3, including a conduit of appreciable length having one end connected to the outlet of said blower unit and a free end provided with a valve and a window for visibly ascertaining the conditions of the product and the position of the valve whereby the relative positions of this valve and said valve means may be correlated to control the density flow of the product through said conduit, a signal carried by said machine, elongate means extending from said signal and having an end for disposition adjacent the free end of said conduit, and means carried by said end of said elongate means for controlling the operation of said signal.

8. A machine of the kind described comprising a cabinet provided with a receptacle for a product to be conveyed and an elongate unrestricted duct disposed within the confines of said cabinet, said duct having an inner extremity communicatively connected with said receptacle adjacent its bottom and extending therefrom, said duct being provided intermediate its length with an outlet in its upper portion for connection with a blower unit whereby the product may be withdrawn from said receptacle into said duct for discharge therefrom, said duct having an outer end, and valve means operatively associated with said outer end for controlling the admission of air into said duct.

9. A machine of the kind described comprising a cabinet provided with a receptacle for a product to be conveyed and a pair of unrestricted elongate separate parallel ducts disposed within the confines of said cabinet and having inner ends communicatively connected with the interior of said receptacle adjacent its bottom and extendnig therefrom, a pair of motorized blower units respectively disposed generally above said ducts and substantially within the confines of said cabinet, said blower units being respectively provided with bottom inlets respectively communicating with upper portions of said ducts at locations intermediate their lengths and having outlets whereby the product may be withdrawn from the receptacle into said ducts and into the chambers for blowing through said outlets, means for selectively operating said blower units, said ducts also having outer ends, and a pair of valve means respectively operatively associated with said outer ends of said ducts for selectively controlling the admission of air into said ducts.

References Cited by the Examiner
UNITED STATES PATENTS

| | | | |
|---|---|---|---|
| 873,300 | 12/1907 | Cranston | 302—65 |
| 1,895,180 | 1/1933 | Tough | 302—63 |
| 2,194,487 | 3/1940 | Thompson. | |
| 2,220,921 | 11/1940 | Thompson. | |
| 2,291,871 | 8/1942 | Bakum | 302—37 |
| 2,311,773 | 2/1943 | Patterson | 302—36 |
| 2,496,146 | 1/1950 | Boughman | 302—36 |
| 2,550,354 | 4/1951 | Jacobsen | 302—37 |
| 2,655,647 | 10/1953 | Peterson | 340—378 |
| 2,843,845 | 7/1958 | Vozza | 340—378 |
| 2,864,655 | 12/1958 | Caron | 302—56 |
| 2,876,043 | 3/1959 | Van Dusen | 302—56 |

SAMUEL F. COLEMAN, *Primary Examiner.*

ANDRES H. NIELSEN, ERNEST A. FALLER,
*Examiners.*